United States Patent
Saitoh et al.

(10) Patent No.: US 6,901,236 B2
(45) Date of Patent: May 31, 2005

(54) METHOD, PROGRAM, AND APPARATUS FOR PREVENTING A REPRODUCTION OF AN ANTI-COPY DOCUMENT, AND A MEDIUM STORING THE PROGRAM

(75) Inventors: Takashi Saitoh, Kanagawa-ken (JP); Haike Guan, Kanagawa-ken (JP); Yasushi Abe, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 10/663,743

(22) Filed: Sep. 17, 2003

(65) Prior Publication Data

US 2004/0090646 A1 May 13, 2004

(30) Foreign Application Priority Data

Sep. 19, 2002 (JP) ........................................ 2002-272784
Jan. 29, 2003 (JP) ........................................ 2003-020646

(51) Int. Cl.[7] ............................................. G03G 21/00
(52) U.S. Cl. ........................ 399/366; 399/365; 382/181
(58) Field of Search .............................. 400/61, 62, 65, 400/70, 72, 73, 76, 88; 235/487, 494; 382/181; 283/902; 380/201, 202; 399/365, 366

(56) References Cited

U.S. PATENT DOCUMENTS

| 5,647,010 A | * | 7/1997 | Okubo et al. | 382/100 |
| 5,740,514 A | * | 4/1998 | Natsudaira | 399/366 |
| 6,252,963 B1 | * | 6/2001 | Rhoads | 380/54 |
| 6,272,245 B1 | * | 8/2001 | Lin | 382/195 |

2001/0040978 A1 11/2001 Abe

FOREIGN PATENT DOCUMENTS

| JP | 06-125459 | 5/1994 |
| JP | 07-036317 | 2/1995 |
| JP | 07-087309 | 3/1995 |
| JP | 09-164739 | 6/1997 |
| JP | 2001-086330 | 3/2001 |
| JP | 2001-197297 | 7/2001 |

* cited by examiner

Primary Examiner—Minh Chau
(74) Attorney, Agent, or Firm—Dickstein Shapiro Morin & Oshinsky LLP

(57) ABSTRACT

An image processing apparatus includes a scanning mechanism, first and second memories, an image accumulating mechanism, a detecting mechanism, a determining mechanism, and a code assigning mechanism. The first memory stores a reference dot pattern indicating an anti-copy background dot pattern. The second memory stores image data. The image accumulating mechanism accumulates image data of an original image into the second memory. The detecting mechanism detects a background dot pattern embedded in a background image included in the image data of the accumulated original image. The determining mechanism compares the detected background dot pattern with the reference dot pattern and determines whether the detected background dot pattern is substantially identical to the reference dot pattern. The code assigning mechanism assigns an identification code to the image data having the detected background dot pattern when the detected background dot pattern is determined as substantially identical to the reference dot pattern.

30 Claims, 11 Drawing Sheets

METHOD, PROGRAM, AND APPARATUS FOR PREVENTING A REPRODUCTION OF AN ANTI-COPY DOCUMENT, AND A MEDIUM STORING THE PROGRAM This application claims priority to Japanese patent application No. 2002-272784 filed on Sep. 19, 2002 and No. 2003-020646 filed on Jan. 29, 2003 in the Japan Patent Office, the entire contents of which are incorporated by reference herein.

FIELD OF THE INVENTION

The present invention relates to a method, program, and apparatus for copy protection, and more particularly to a method, program, and apparatus for detecting an anti-copy document, prohibiting reproduction thereof, and tracking unauthorized reproduction of an anti-copy document.

BACKGROUND OF THE INVENTION

With recent improvements in image processing and image forming technologies, it has become possible that a high-tech digital color copying apparatus, for example, can reproduce a monetary document with high fidelity such that the reproduced image is hardly distinguishable from the original. Monetary document includes paper currency, securities, and the like, for example, and cannot normally be copied since unauthorized monetary document reproduction is illegal. Therefore, high-tech digital color copying apparatuses require a feature that prevents high fidelity reproduction of an anti-copy document such as a monetary document, a confidential document, etc. With this feature, reproduction of an anti-copy document may be prevented entirely or can be affected such that the resulting copy is unreadable, for example.

Many confidential documents besides monetary documents are not intended for unrestricted reproduction or copying such as documents that include trade secrets. These documents require copy protection to prevent unauthorized reproduction using high-tech digital color copying apparatuses.

Under these circumstances, various techniques have been used with the above-mentioned high-tech digital color copying apparatus in an attempt to restrict unauthorized image reproduction with high fidelity.

Japanese Laid-Open Unexamined Patent Application Publication, No. 06-125459 describes a technique for recognizing a special document such as a currency, a security, and so on by comparing input image data with a previously stored specific mark using a pattern matching and determining that the input image data is a special, or copy protected, document when the input image data is found to contain the previously stored specific mark. Japanese Laid-Open Unexamined Patent Application Publication, No. 2001-086330 also describes a similar technique. If an input original is determined to be a special document in this way, an unauthorized reproduction of this document can readily be prevented.

The above technique requires reference pattern data to be applied to or associated with the anti-copy protection for a specific document. However, it would be difficult to apply anti-copy protection using fixed reference pattern data to an indefinite number of copy protected or confidential documents.

As another example, Japanese Laid-Open Unexamined Patent Application Publication, No. 07-036317 describes a technique for recognizing a confidential document as a copy-prohibited document by detecting a specific mark such as "CONFIDENTIAL," for example, printed on the confidential document and indicative of its confidentiality. A print of such a specific mark indicating a document's confidentiality is a common practice used in the above-mentioned publication. When an input original is determined to be a special document in this way, unauthorized reproduction of the document can be prevented. Japanese Laid-Open Unexamined Patent Application Publication, No. 07-087309 also describes a similar method.

However, when a confidential document is marked with or includes a specific confidential mark such as "CONFIDENTIAL," for example, a copy of the confidential document can easily be made by concealing the specific confidential mark by covering the mark with a piece of paper, for example. Thus, the anti-copy protection fails to protect the confidential document from copying.

Japanese Laid-Open Unexamined Patent Application Publication, No. 09-164739 also describes a similar technique for restricting document reproduction by embedding a watermark in an original image requiring copy protection. This technique uses a paper document having a specific background image to which an original image is attached. The specific background image includes a watermark pattern having a base area and a message area. From its nature, the watermark pattern is inconspicuous in comparison with the original image and therefore it does not render the original image unreadable. This technique, however, causes the watermark pattern to appear when the original image having this watermark pattern is copied. The watermark pattern of this technique includes a warning such as "anti-copy," for example, so that a copy of this original document is recognized easily at a glance as a confidential document which is intended to be protected from copying. Therefore, this technique has a psychological effect that tends to inhibit a person from copying a confidential document.

However, this technique produces the above-mentioned psychological effect only after copy is made. Therefore, anti-copy protection that uses a watermark of this nature does not inhibit persons who disregard the watermark pattern.

In this way, a copy can be made even if the document is a copy-protected document, and what is difficult when a copy-protected document is found copied is to identify which confidential document is copied and/or who made that copy.

SUMMARY OF THE INVENTION

The present invention provides a novel image processing apparatus that performs anti-copy protection capable of tracking an unauthorized reproduction of an anti-copy document.

The present invention also provides a novel image processing method that performs anti-copy protection capable of tracking an unauthorized reproduction of an anti-copy document.

The present invention also provides a novel computer program product stored on a computer readable storage medium which, when run on an image processing apparatus, carries out an image processing method that performs anti-copy protection capable of tracking an unauthorized reproduction of an anti-copy document.

The present invention also provides a novel computer readable medium that stores computer instructions for performing an image processing method that performs anti-copy protection capable of tracking an unauthorized reproduction of an anti-copy document.

In one exemplary embodiment, a novel image processing apparatus includes a scanning mechanism, a first memory, a second memory, an image accumulating mechanism, a detecting mechanism, a determining mechanism, and a code assigning mechanism. The scanning mechanism is configured to read images. The first memory stores a reference dot pattern indicating an anti-copy background dot pattern. The second memory stores image data. The image accumulating mechanism is configured to accumulate image data of an original image which is read by the scanning mechanism into the second memory. The detecting mechanism is configured to detect a background dot pattern embedded in a background image included in the image data of the original image accumulated in the second memory. The determining mechanism is configured to compare the detected background dot pattern with the reference dot pattern stored in the first memory and to determine whether the detected background dot pattern is substantially identical to the reference dot pattern. The code assigning mechanism is configured to assign an identification code to the image data having the detected background dot pattern and accumulated in the second memory when the detected background dot pattern is determined by the determining mechanism as substantially identical to the reference dot pattern.

The above-mentioned image processing apparatus may further include a communications mechanism configured to transmit to a specific computer information indicative of a determination result from the determining mechanism and the identification code assigned to the image data having the detected background dot pattern when the detected background dot pattern is determined by the determining mechanism as substantially identical to the reference dot pattern.

The above-mentioned image processing apparatus may further include a communications mechanism configured to encipher the image data having the detected background dot pattern and stored in the second memory when the detected background dot pattern is determined by the determining mechanism as substantially identical to the reference dot pattern and to transmit to a specific computer information indicative of a determination result from the determining mechanism and the enciphered image data as well as the identification code assigned to the image data having the detected background dot pattern.

The communications mechanism may transmit to the specific computer the information indicative of a determination result from the determining mechanism and the enciphered image data as well as the identification code assigned to the image data having the detected background dot pattern.

The above-mentioned image processing apparatus may further include an information inputting mechanism configured to receive user input, including the identification code and a reproducing mechanism configured to reproduce the image data to which the identification code is assigned when the information inputting mechanism receives the user input including the identification code.

The above-mentioned image processing apparatus may further include an information inputting mechanism configured to receive user input, including the identification code and an identification of a specific user, an information verifying mechanism configured to verify the identification code and the identification of the specific user, and a reproducing mechanism configured to reproduce the image data to which the identification code is assigned when the information inputting mechanism receives the user input including the identification code and the identification of the specific user and when the information verifying mechanism correctly verifies the identification code and the identification of the specific user.

Further, in one embodiment, a novel image processing method includes storing a reference dot pattern indicating an anti-copy background dot pattern and image data, reading an original image, accumulating image data of the original image read by the reading step, and detecting a background dot pattern embedded in a background image included in the image data of the original image accumulated by the accumulating step. The image processing method further includes comparing the background dot pattern detected by the detecting step with the reference dot pattern stored by the storing step, determining whether the detected background dot pattern is substantially identical to the reference dot pattern, and assigning an identification code to the image data having the detected background dot pattern and accumulated by the accumulating step when the detected background dot pattern is determined by the determining step as substantially identical to the reference dot pattern.

The above-mentioned image processing method may further include transmitting to a specific computer information indicative of a determination result made by the determining step and the identification code assigned to the image data having the detected background dot pattern when the detected background dot pattern is determined by the determining step as substantially identical to the reference dot pattern.

The above-mentioned image processing method may further include enciphering the image data having the detected background dot pattern and stored by the storing step when the detected background dot pattern is determined by the determining step as substantially identical to the reference dot pattern and transmitting to a specific computer information indicative of a determination result made by the determining step and the enciphered image data as well as the identification code assigned to the image data having the detected background dot pattern.

The transmitting step may transmit to the specific computer the information indicative of a determination result made by the determining step and the enciphered image data as well as the identification code assigned to the image data having the detected background dot pattern.

The above-mentioned image processing method may further include receiving a user input including the identification code and reproducing the image data to which the identification code is assigned when the receiving step receives the user input including the identification code.

The above-mentioned image processing method may further include receiving user input including the identification code and an identification of a specific user, verifying the identification code and the identification of the specific user, and reproducing the image data to which the identification code is assigned when the receiving step receives the user input including the identification code and the identification of the specific user and when the verifying step correctly verifies the identification code and the identification of the specific user.

Further, in one embodiment, a computer program product stored on a computer readable storage medium run on an image processing apparatus executes an image processing method, as described above.

Further, in one embodiment, a computer readable medium storing computer instructions performs an image processing method, as described above.

BRIEF DESCRIPTION OF THE DRAWINGS

A more complete appreciation of the disclosure and many of the attendant advantages thereof will be readily understood by reference to the following detailed description and the accompanying drawings, wherein.

DETAILED DESCRIPTION OF PREFERRED EMBODIMENTS

Figure 1:
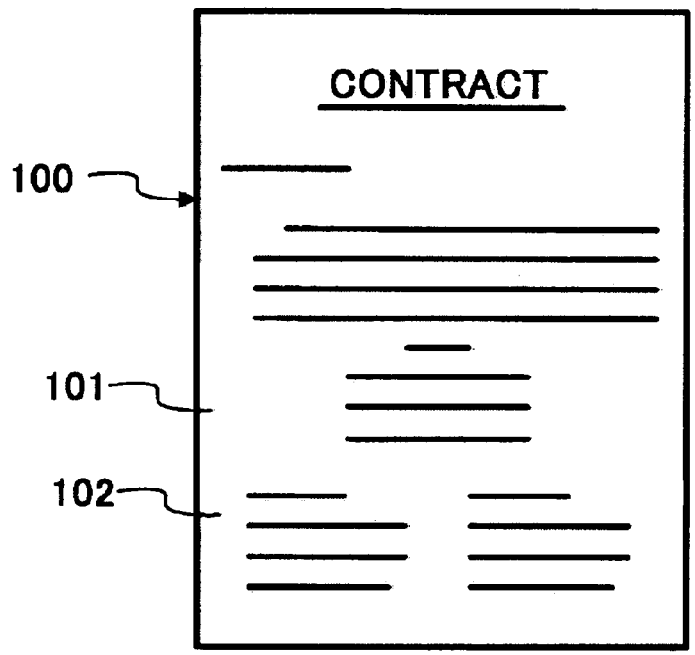
FIG. 1 is an illustration showing an exemplary original image of a contract document.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 1–3, 4A, 4B, 5A, and 5B, a description is provided for anti-copy watermarks processed by several image processing apparatuses (discussed below) according to exemplary embodiments of the present invention.

Figure 2:
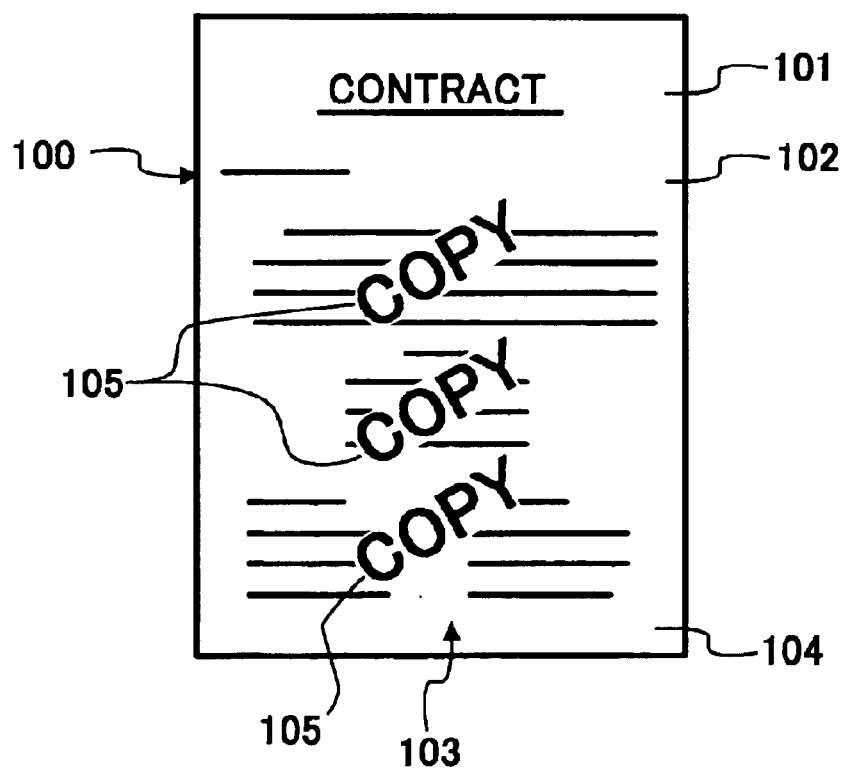
FIG. 2 is an illustration showing one exemplary reproduction of the FIG. 1 contract document in which a watermark pattern is formed as a background dot pattern and embedded in the original image of the contract document.
Figure 3:
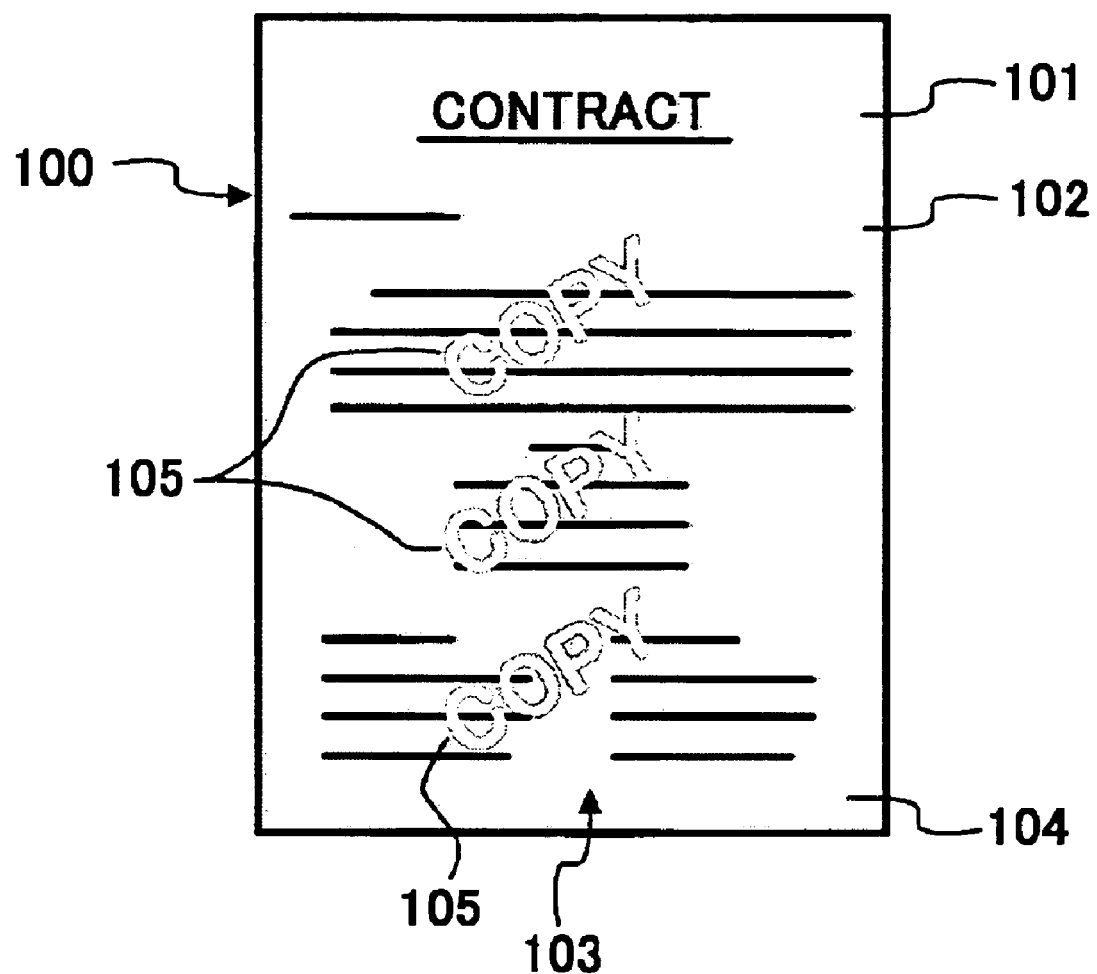
FIG. 3 is an illustration showing another exemplary reproduction of the FIG. 1 contract document in which a watermark pattern is formed as a background dot pattern and embedded in the original image of the contract document.

FIG. 1 shows a contract document 100 as an example of an anti-copy original document. The contract document 100 includes an original image 101 indicating a specific contract and an original sheet 102 on which the original image 101 is printed. FIG. 2 shows one example of a copy of the contract document 100. In this copy of FIG. 2, a watermark pattern 103 is embedded as a background dot pattern in the surface of the original sheet 102 and is formed as a plurality of words "COPY" together with the original image 101. The watermark pattern 103 includes a base area 104 and a plurality of message areas 105. FIG. 3 shows a second example of a copy of the contract document 100. Alternatively, the watermark pattern 103 can be added to the surface of the original sheet 102 when the original image 101 is formed thereon, instead of being previously embedded in the surface of the original sheet 102, as in FIG. 2.

In the watermark pattern 103, the base area 104 represents a background area which is a major portion of the watermark pattern 103. The message areas 105 are the areas distributed within the base area 104 for expressing messages such as a word "COPY," for example. Of course, any other words, phrases, letters, symbols, etc. can be expressed in the message areas 105. The base area 104 and the message areas 105 are not respectively defined based on basic structural differences with respect to each other but rather they are defined based on value based choices regarding visual considerations.

When a copy is made from the contract document 100 having the original image 101 printed on the original sheet 102, a part of the watermark pattern 103, that is, either the base area 104 or the message areas 105 appear together with the original image 101. In one case, as illustrated in FIG. 2, the images in the message areas 105 show up and, as a result, the words "COPY" appear in a solid character form. In another case, as illustrated in FIG. 3, the base area 104 shows up and, as a result, the words "COPY" appear in an outline character form.

In other words, one of the images in the base area 104 and the message areas 105 is resistant to copying, and the other one of the images in the base area 104 and the message areas 105 is susceptible to copying. Referring to FIG. 2, the image in the base area 104 of the watermark pattern 103 is resistant to copying and the images in the message areas 105 are susceptible to copying, so that the image of the message area 105 shows up in solid form (i.e., solid letters "COPY" appear). On the other hand, the FIG. 3 copy shows that the image in the base area 104 is susceptible to copying and the images in the message areas 105 are resistant to copying such that the image of the base area 104 appears and therefore the images of the message areas 105 appears in white (i.e., the letters "COPY" appear in outline character form).

Figure 4A:
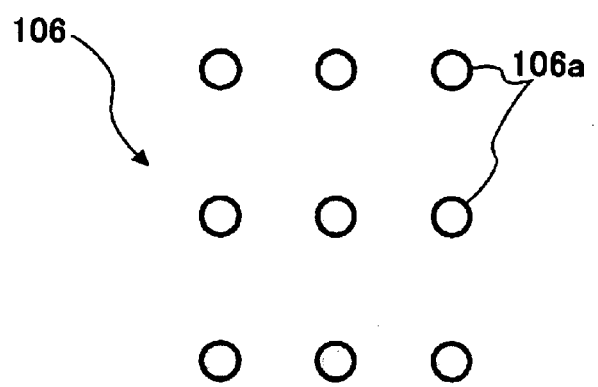
FIG. 4A is an enlarged illustration of the watermark of FIG. 3 with an exemplary watermark pattern.
Figure 4B:
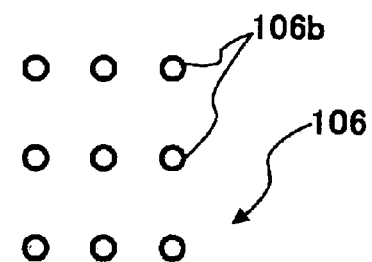
FIG. 4B is an enlarged illustration of the watermark of FIG. 3 with a second exemplary watermark pattern.
Figure 5A:
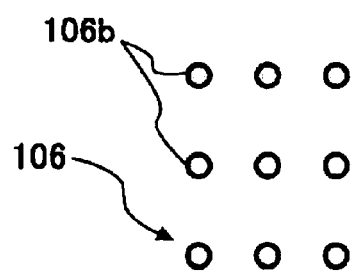
FIG. 5A is an enlarged illustration of the watermark of FIG. 2 with an exemplary watermark pattern.
Figure 5B:
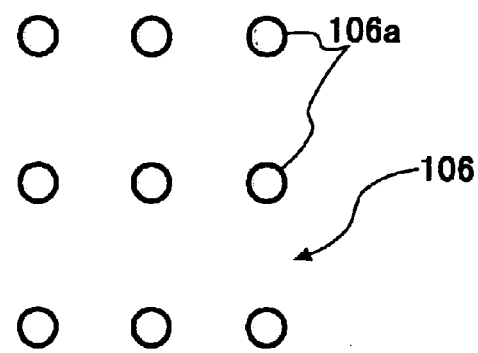
FIG. 5B is an enlarged illustration of the watermark of FIG. 2 with a second exemplary watermark pattern.

FIGS. 4A and 4B illustrate an enlarged portion of the watermark pattern 103 of FIG. 3, and FIGS. 5A and 5B illustrate an enlarged portion of the watermark pattern 103 of FIG. 2. As illustrated in FIGS. 4A, 4B, 5A, and 5B, the above-described watermark pattern 103 is made of an aggregation of dots 106 which are separated into two dot groups; one group includes first dots 106a having a large dot size and the other group includes second dots 106b having a small dot size, as illustrated in FIGS. 4A, 4B, 5A, and 5B. That is, the first dots 106a have a sufficiently large size to be susceptible to copying and the second dots 106b have a sufficiently small size to be resistant to copying. In other words, in the watermark pattern 103 of FIG. 2, the image in the base area 104 is made of the second dots 106b shown in FIG. 5A and the images in the message areas 105 are made of the first dots 106*a* shown in FIG. 5B. Consequently, images in the message areas 105 show up and the letters "COPY" show up in solid character form.

On the other hand, in the watermark pattern 103 of FIG. 3, the image in the base area 104 is made of the first dots 106*a* shown in FIG. 4A and the images in the message areas 105 are made of the second dots 106*b* shown in FIG. 4B. Consequently, images in the base area 104 appear and the letters "COPY" appear in outline character form.

Although described as dots, the watermark pattern 103 is not so limited. For example, it is possible to use other patterns such as, for example, a thin line pattern, a specific design pattern, and so forth to form the images in the base area 104 and the message areas 105 of the watermark pattern 103.

The present exemplary embodiment deals with one of the base area 104 and the message areas 105 in quantitative characteristic. For example, when the image formed contains dots 106, as described above, it is expressed by a characteristic such as size, density (i.e., a number of dots per unit area), or the like. When the image showing up is formed of thin lines, it is expressed by a characteristic such as width of the lines, for example. When the image showing up is formed of specific patterns, it can be expressed by a characteristic of the specific pattern, for example.

As an alternative, it is possible to deal with one of the images in the base area 104 and the message areas 105, which is not shown up, as data expressed in quantitative characteristic. It is further possible to deal with both of the images in the base area 104 and the message areas 105, which appear and do not appear upon copying, as data expressed in the respective characteristic quantities. In other words, when at least one of the images in the base area 104 and the message areas 105, which are either embedded in the original sheet 102 or formed during the time the original image 101 is formed, is characterized as computer-readable data, these images can be handled as data expressed in the respective characteristic quantities when the original image 101 printed on the original sheet 102 is read.

As described above, it is also possible to use a background dot pattern different from the watermark pattern 103 of, for example, FIG. 2. For example, the pattern of the base area 104 or the message areas 105 in the watermark pattern 103 can be used as an alternative background dot pattern. In this case, when the pattern of the base area 104 or the message areas 105, which is either embedded in the original sheet 102 or formed during the time an original image including the pattern is formed, is in the form of computer-readable data, the pattern can also be handled as data expressed in the corresponding characteristic quantities when the original image printed on the original sheet 102 is read.

An exemplary image processing method according to an exemplary embodiment of the present invention uses hardware resources including digital circuits, a computer, and so forth in order to store image data read from the original image 101, for example, in an image memory (e.g., an image accumulator 212 (FIG. 8) or a hard disc drive (HDD) 316 (FIG. 10)). The image processing method then performs an identity determination step, detecting, from the image data, at least one of the images in the base area 104 and the message areas 105 included in the watermark pattern 103 embedded in a background image included in the image data read from the original image 101. This detecting step detects the characteristics of the above-described watermark pattern 103, that is, for example, the dot size, the dot density, the line width, the design pattern, and so forth. After this detecting step, the image processing method performs, by using the hardware resources, a step of determining whether the detected watermark pattern 103 is substantially identical to a reference anti-copy watermark pattern prepared as a background anti-copy dot pattern stored in a memory area (not shown) by comparing the detected watermark pattern 103 with the reference anti-copy watermark pattern.

More specifically, the identity determination step determines whether a difference between the characteristic quantities (e.g., the dot density) of the detected watermark pattern 103 and the reference anti-copy watermark pattern is smaller than a predetermined threshold value. That is, when the difference is determined as smaller than the predetermined threshold value, the identity determination step determines that the detected watermark pattern 103 is substantially identical to the reference anti-copy watermark pattern.

Therefore, by previously storing the above-described reference anti-copy watermark pattern as the anti-copy background dot pattern in the memory, this image processing method according to the exemplary embodiment of the present invention can check whether the detected watermark pattern 103 is substantially identical to such reference anti-copy watermark pattern so as to determine whether to restrict an output of the image data according to the original image 101, regardless of what contents the original image 101 has.

When the detected watermark pattern 103 is determined as substantially identical to the reference anti-copy watermark pattern stored in the memory area, the image processing method of the present exemplary embodiment assigns an identification code to the corresponding image data stored in the image memory (e.g., the image accumulator 212 (FIG. 8) or the HDD 316 (FIG. 10)). Accordingly, when an unauthorized reading of an original image (e.g., the original image 101) that has the background anti-copy dot pattern is made, the image processing method of the present exemplary embodiment can trace and identify the original image read in the unauthorized manner based on the identification code assigned to that original image.

In addition, when the detected watermark pattern 103 is determined as substantially identical to the reference anti-copy watermark pattern stored in the memory area, the image processing method of the present exemplary embodiment enciphers the corresponding image data stored in the image memory (e.g., the image accumulator 212 (FIG. 8) or the HDD 316 (FIG. 10)). Subsequently, the image processing method performs a step of transmitting the determination result and the identification code as well as the enciphered image data to a computer used by a specific user such as a manager who has an authority in handling anti-copy document. The transmission is performed using e-mail, for example. With this procedure, it becomes possible for the specific user such as a manager to be notified of the event that an original image having an anti-copy background dot pattern is read. If the computer of the specific user such as a manager has a function for deciphering data that is enciphered, the user who receives the enciphered image data together with the determination result can decipher the enciphered image data received to see the actual image data having the anti-copy background dot pattern.

Further, when the hardware resources of the image processing method, such as the digital circuits, the computer, and the like, include an image processing apparatus, the image processing method of such an image processing apparatus performs steps of receiving an enter of identification code and outputting the image data to which the entered identification code is assigned. Subsequently, the image processing method performs a step of outputting the image data with the assigned identification code, or the image data having the anti-copy background dot pattern. The outputting step is carried out in a form of print. In this case, it is possible to add the steps of receiving an enter of authorized code such as a manager's code, for example. Then, the image processing method performs the steps of determining whether the code entered is admissible as authorized code, and outputting the image data when the code entered is determined as admissible as authorized code.

Figure 6:
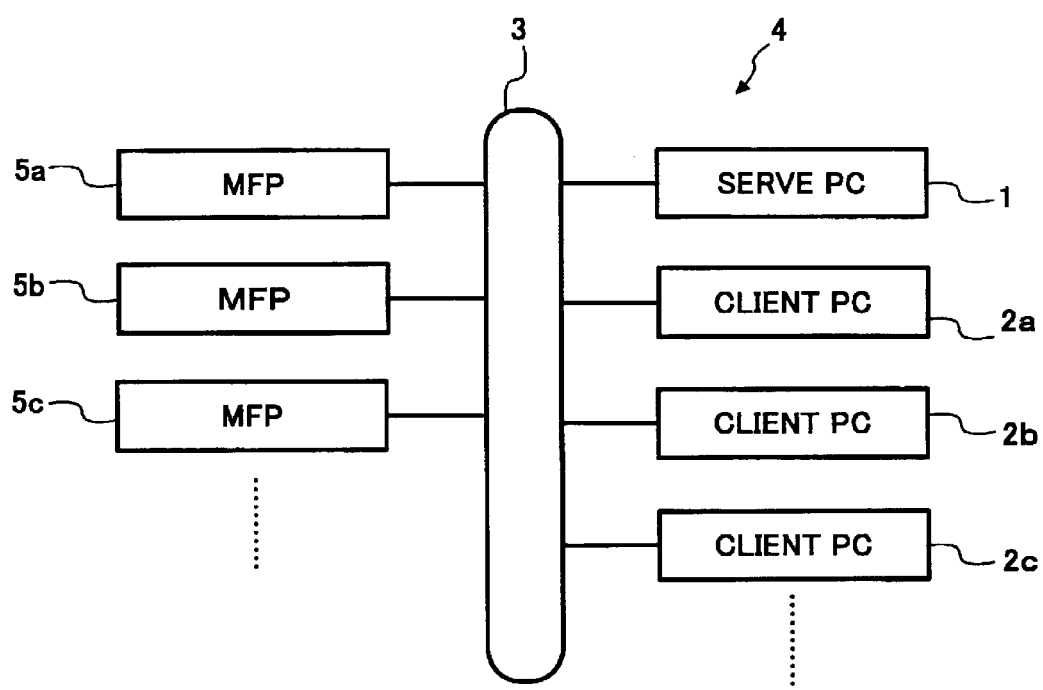
FIG. 6 is a schematic block diagram of an image processing system including an image processing apparatus according to one exemplary embodiment of the present invention.

FIG. 6 illustrates a schematic diagram of a server-client system in accordance with an exemplary embodiment of the present invention. The server-client system 4 which includes a server PC (personal computer) 1 and a plurality of client PCs (personal computer) including PC 2a, 2b, 2c, and so on connected to each other through a communications network 3, such as a LAN (local area network), a WAN (wide area network), or the like, and a plurality of image processing apparatuses including image processing apparatuses 5a, 5b, 5c, and so on and each having a configuration of multifunction printer (MFP). At least one of the client PCs, for example, the client PC 2a is assigned as a manager's computer on which a manager having an authority in handling anti-copy document works as a user. The server-client system 4 structured in this way has an operational connection to the MFPs 5a, 5b, 5c, and so on through the communications network 3.

Figure 7:
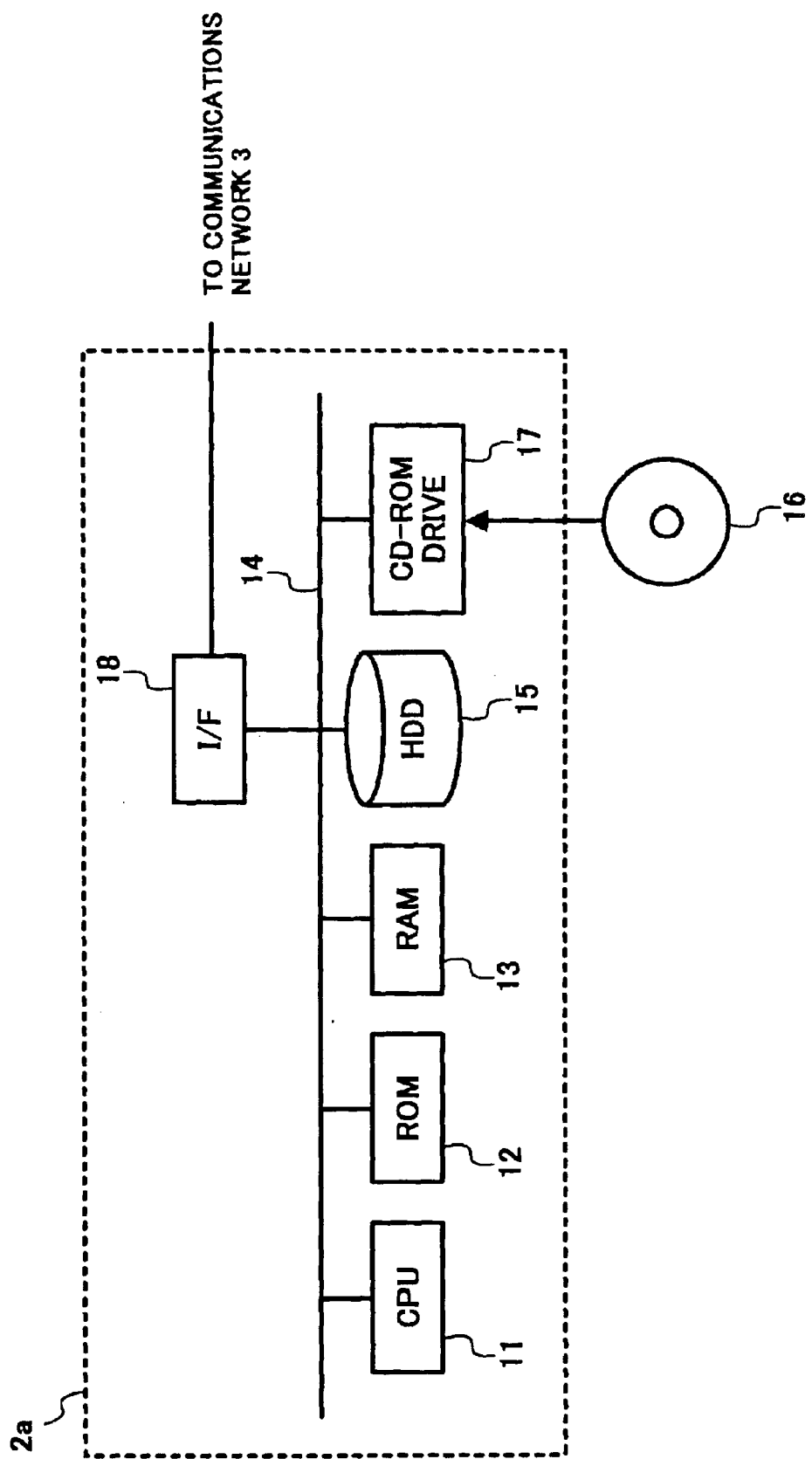
FIG. 7 is a schematic block diagram of an image processing apparatus according to a second exemplary embodiment of the present invention.

Referring to FIG. 7, each of the client PCs 2a, 2b, 2c, and so on of FIG. 6 includes various components. For example, client PC 2a includes a CPU (central processing unit) 11, a ROM (read only memory) 12, a RAM (random access memory) 13, an internal data bus 14, a HDD (hard disc drive) 15, a CD-ROM drive 17, and an interface 18. The CPU 11 controls the operations of the client PC 2a. The ROM 12 stores various programs for the CPU 11 to work with, including an operational system (e.g., MS WINDOWS), a BIOS (basic input output system), and so on. The RAM 13 provides a working memory area for the CPU 11 to store various kinds of data including transaction data, for example. The HDD 15 stores a computer program including an image processing program. The CD-ROM drive 17 drives a CD-ROM (compact disc read only memory) 16 which is inserted in the CD-ROM drive 17 by a user to read data stored in the CD-ROM 16. The interface 18 interfaces communications with external equipment, such as the image processing apparatuses 5a, 5b, 5c, (FIG. 6) and so on, through the communications network 3 (FIG. 6). The internal data bus 14 connects these components of the client PC 2a to each other.

In one example, the image processing program installed in the HDD 15 is a program initially stored on the CD-ROM 16 and loaded to the HDD 15 under control of the CPU 11. When the CPU 11 starts the image processing program stored in the HDD 15 is started, it first copies the image processing program in the RAM 12 and then executes the program. In this case, each of the RAM 13, the HDD 15, and the CD-ROM 16 is regarded as a data storing medium to store the computer programs including the image processing program.

As an alternative to using the CD-ROM 16 to store the computer programs, various kinds of medium can be used, such as optical discs including a DVD (digital versatile disc), magneto-optical discs, magnetic discs including a flexible disc, semiconductor memory, etc. It is also possible to install the computer programs in the HDD 15 by downloading them from a data server serving as an external program resource through the Internet. In this case, a data storing device of the data server for storing the computer programs including the image processing program is regarded as a data storing medium to store the computer programs including the image processing program.

The above-mentioned image processing program may be a program running on a predetermined operating system, or a program included in a program file of series programs forming a predetermined application software such as a word-processing application or in a predetermined operating system.

Figure 8:
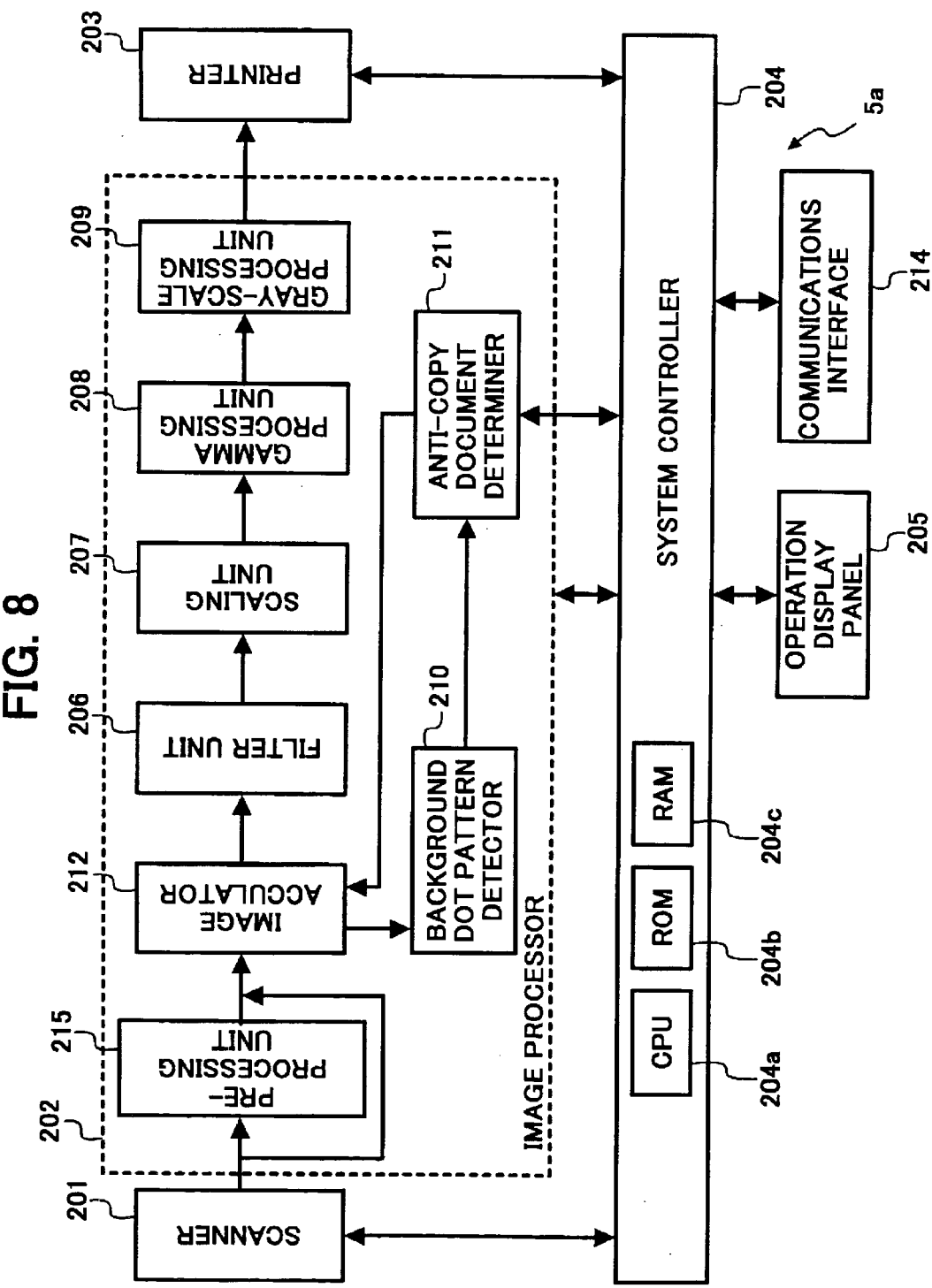
FIG. 8 is a schematic block diagram of an image processing apparatus according to a third exemplary embodiment of the present invention.

Referring to FIG. 8 each imaging processing apparatus 5a, 5b, 5c of FIG. 6 includes several components. For clarity's sake the image processing apparatus 5a will be explained as a digital copying machine having an MFP configuration. The image processing apparatus 5a includes a scanner 201, an image processor 202, a printer 203, a system controller 204, an operation display panel 205, and a communications interface 214. The system controller 204 includes a CPU (central processing unit) 204a, a ROM (read only memory) 204b, and a RAM (random access memory) 204c. By using computing functions achieved with these components, the system controller 204 controls the operations of the scanner 201, the image processor 202, and the printer 203 in accordance with instructions input through the operation display panel 205 and displays necessary information on the operation display panel 205.

The image processor 202 includes a pre-processing unit 215, an image accumulator 212, a filter unit 206, a scaling unit 207, a gamma processing unit 208, a gray-scale processing unit 209, a background dot pattern detector 210, and an anti-copy document determiner 211. Amongst these components, the filter unit 206, the scaling unit 207, the gamma processing unit 208, and the gray-scale processing unit 209 are similar to those generally used in an ordinary digital copying machine and therefore an explanation for these components is omitted.

The background dot pattern detector 210 and the anti-copy document determiner 211 of the image processor 202 are hardware resources including digital circuits for detecting and determining an anti-copy document such as the contract document 100 of FIG. 1 and prohibiting duplication of such document. When a document is determined as anti-copy document by the background dot pattern detector 210 and the anti-copy document determiner 211, an identification code is assigned to the image data of the document and is stored together with the image data in the image accumulator 212.

The image data read by the scanner 201 is transmitted to the pre-processing unit 215 and is then accumulated in the image accumulator 212. The process of the pre-processing unit 215 may be omitted on an as-needed basis. The image data accumulated in the image accumulator 212 is output through, as necessary, the processes of the filter 206, the scaling unit 207, the gamma processing unit 208, and the gray-scale processing unit 209 unless the image data is determined as data of anti-copy document by a process later explained.

Figure 9:
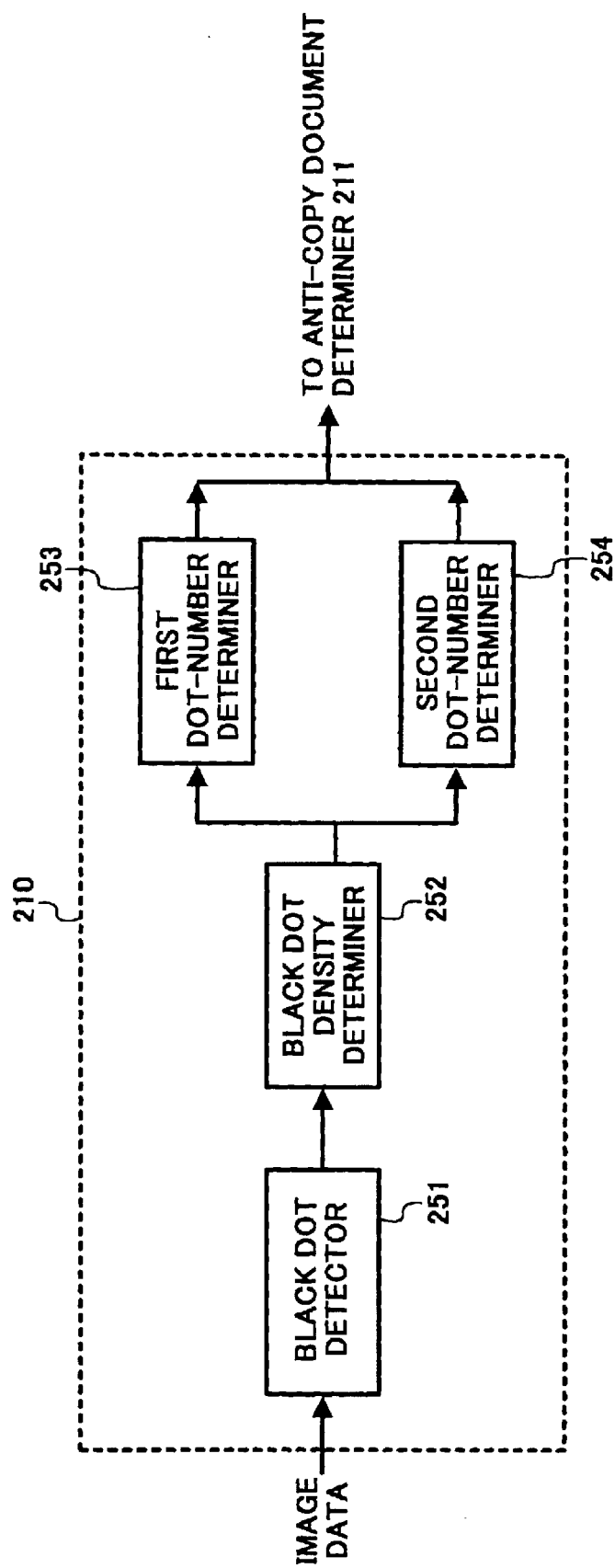
FIG. 9 is a schematic block diagram of a background dot pattern detector.

The background dot pattern detector 210 has an exemplary hardware structure as illustrated in FIG. 9, including a black dot detector 251, a black dot density determiner 252, a first dot-number determiner 253, and a second dot-number determiner 254. The black dot detector 251 detects the dots 106 from the image data generated based on the readings of the original image 101 by the scanner 201. An actual detection method is selected from among various known techniques for detecting image patterns with digital circuits, such as a pattern matching technique, for example. After detection of dots 106, the black dot density determiner 252 calculates a dot density within a specific area with respect to the dots 106 detected by the black dot detector 251. This calculation can be performed using digital counters, adders, and so on.

In the background dot pattern detector 210, both the first dot-number determiner 253 and the second dot-number determiner 254 include a memory area (not shown). The first dot-number determiner 253 stores first and second base area threshold values. The first base area threshold value is used by the CPU 204a (FIG. 8) as a permissible value in the identity determination relative to a dot density in a specific unit area of the base area 104 (e.g., FIG. 2) in the watermark pattern 103 (e.g., FIG. 2) indicating the background anti-copy dot pattern. The above specific unit area is an area on which the black dot density determiner 252 performs the dot density calculation. The second base area threshold value is used by the CPU 204a (FIG. 8) as a permissible value in the identity determination relative to a dot number included in a whole area of the base area 104 (e.g., FIG. 2) in the watermark pattern 103 (e.g., FIG. 2) indicating the anti-copy mark in one original sheet (e.g., the original sheet 102 of FIG. 1).

The second dot-number determiner 254 stores first and second message area, e.g., 105 (e.g., FIG. 3) threshold values. The first message area threshold value is used by the CPU 204a (FIG. 8) as a permissible value in the identity determination relative to a dot density in a specific unit area of the message area 105 (e.g., FIG. 3) in the watermark pattern 103 (e.g., FIG. 3) indicating the background anti-copy dot pattern. The above-mentioned specific unit area is an area on which the black dot density determiner 252 performs the dot density calculation. The second message area threshold value is used by the CPU 204a (FIG. 8) as a permissible value in the identity determination relative to a dot number included in a whole area of the message area 105 (e.g., FIG. 3) in the watermark pattern 103 (e.g., FIG. 3) indicating the anti-copy mark in one original sheet (e.g., the original sheet 102 of FIG. 3).

The first dot-number determiner 253 accumulates in a counter (not shown) the number of dots 106 (e.g., FIG. 4A) which are determined as the identical size, i.e., the first dots 106a (e.g., FIG. 4A) or the second dots 106b (e.g., FIG. 4B), by the black dot detector 251. The first dot-number determiner 253 increments the counter during operations to determine whether the density of dots 106 (e.g., FIG. 4A) calculated by the black dot density determiner 252 is smaller than the first base area threshold value stored in the memory. The first dot-number determiner 253 then determines that the base area 104 (e.g., FIG. 3) of the anti-copy watermark pattern 103 (e.g., FIG. 3) exists when the accumulated dot number is checked out as smaller than the second base area threshold value stored in the memory. The first dot-number determiner 253 transmits the determination result to the anti-copy document determiner 211.

The second dot-number determiner 254 accumulates the number of dots 106 (e.g., FIG. 4A) in a counter (not shown), for example, which are determined as the identical size, i.e., the first dots 106a (e.g., FIG. 4A) or the second dots 106b (e.g., FIG. 4B), by the black dot detector 251. The second dot-number determiner 254 (e.g., FIG. 4A) increments the counter during operations to determine whether the density of dots 106 (e.g., FIG. 4A) calculated by the black dot density determiner 252 is smaller than the first message area threshold value stored in the memory. The second dot-number determiner 254 then determines that the message area 105 (e.g., FIG. 3) of the anti-copy watermark pattern 103 (e.g., FIG. 3) exists when the accumulated dot number is checked out as smaller than the second message area threshold value stored in the memory. The second dot-number determiner 254 transmits the determination result to the anti-copy document determiner 211.

Upon receiving the determination result from the background dot pattern detector 210, the anti-copy document determiner 211 performs the determination process for determining whether the present document is an anti-copy document with reference to a predefined standard. This standard can be, for example, input as parameters through the operation display panel 205 (FIG. 8) and is stored in a memory area (not shown) of the anti-copy document determiner 211. For example, the anti-copy document determiner 211 determines that the present document is an anti-copy document, e.g. a confidential document, upon determining that one of the base area 104 (e.g., FIG. 3) and the message area 105 (e.g., FIG. 3) of the watermark pattern 103 (e.g., FIG. 3) exists in the original image 101 (e.g., FIG. 3) read by the scanner 201 (FIG. 8). In another example, the anti-copy document determiner 211 determines that the present document is an anti-copy document, e.g. a confidential document, upon determining that both of the base area 104 (e.g., FIG. 3) and the message area 105 (e.g., FIG. 3) of the watermark pattern 103 (e.g., FIG. 3) exist in the original image 101 (e.g., FIG. 3) read by the scanner 201 (FIG. 8). The anti-copy document determiner 211 can be used for the determination with respect to one of the base area 104 (e.g., FIG. 3) and the message area 105 (e.g., FIG. 3), that is, to determine whether the base area 104 (e.g., FIG. 3) or the message area 105 (e.g., FIG. 3) of the watermark pattern 103 (e.g., FIG. 3) exists in the original image 101 (e.g., FIG. 3) read by the scanner 210 (FIG. 8). In this configuration, the first dot-number determiner 253 or the second dot-number determiner 254 can be eliminated.

Upon determining that the original image 101 (e.g., FIG. 3) read by the scanner 201 (FIG. 8) is an anti-copy document, the anti-copy document determiner 211 (FIG. 8) assigns an identification code to the image data of the original image 101 (e.g., FIG. 3) stored in the image accumulator 212 (FIG. 8). The identification code may include a unique time-series number within the image processing apparatus 5a (FIG. 8) or a unique number assigned under the conditions of network environment including the communications network 3 (FIG. 6).

Next, an exemplary structure of an image processing apparatus 5b, as another example, according to an exemplary embodiment of the present invention is explained with reference to FIG. 10. As described above, the image processing apparatus 5a of FIG. 8 achieves an exemplary copy protection operation which uses the hardware resources to detect and determine the anti-copy document and to assign an identification code to the image data of the anti-copy document. A difference of the image processing apparatus 5b from the image processing apparatus 5a is an implementation of software resources for executing the anti-copy protection operation including the steps of detecting and determining the anti-copy document and assigning an identification code to the image data of the anti-copy document, further discussed below.

Figure 10:
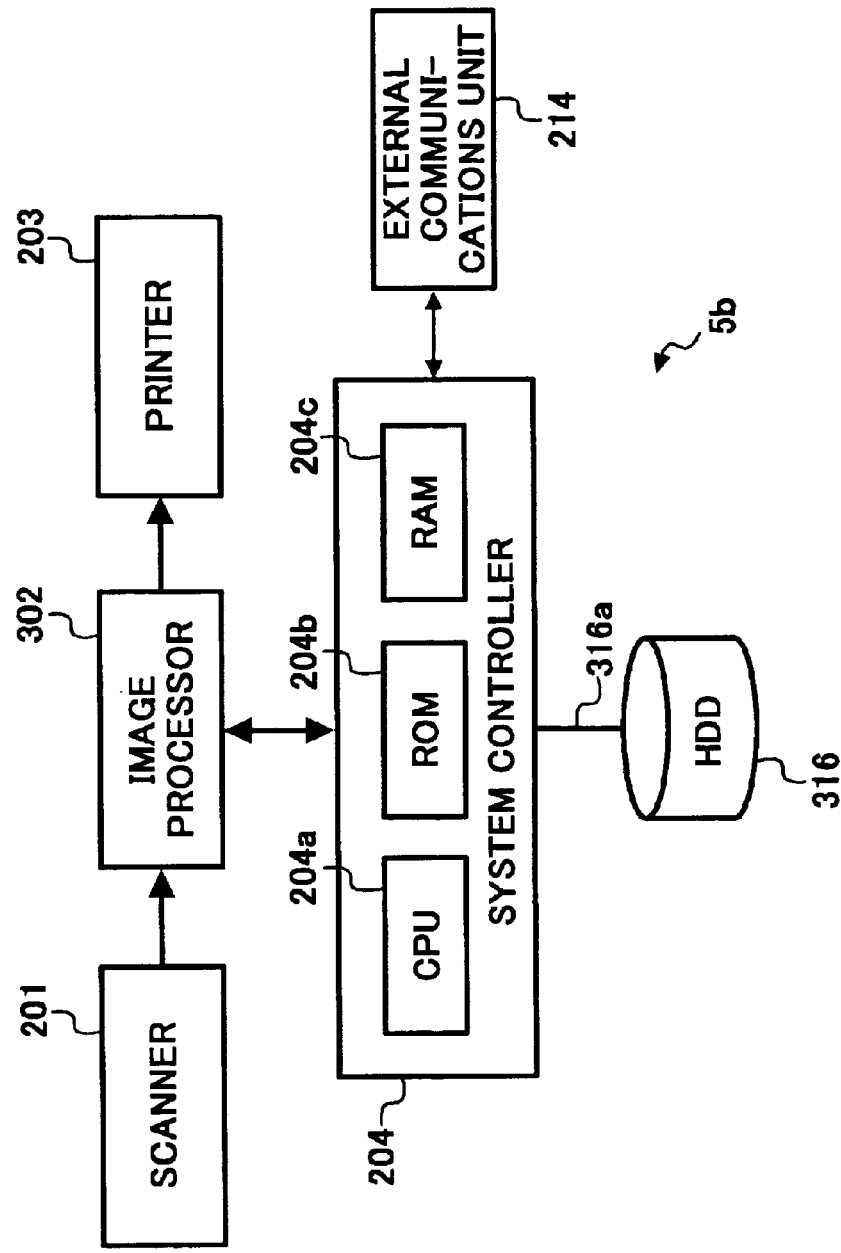
FIG. 10 is a schematic block diagram of an image processing apparatus according to another exemplary embodiment of the present invention.

As shown in FIG. 10, the image processing apparatus 5b includes the scanner 201, an image processor 302, the printer 203, the system controller 204, a hard disc drive (HDD) 316, and an HDD data bus 316a. Amongst these components, the scanner 201, the printer 203, and the system controller 204 are equivalent to those shown in FIG. 8. Unlike the image processor 202 of FIG. 8, the image processor 302 of FIG. 10 does not include the background dot pattern detector 210 and the anti-copy document detector 211, which together perform the above-mentioned anti-copy protection operation. Instead, a computer program for executing the anti-copy protection operation including the steps of detecting and determining the anti-copy document and assigning an identification code to the image data of the anti-copy document is installed as a firmware in the ROM 204b of the system controller 204. In addition, the HDD 316 serves as an image accumulator 212 (FIG. 8). As an alternative, such computer program for the anti-copy protection operation may be installed in the HDD 316 connected to a micro computer configured by the CPU 204a, the ROM 204b, and the RAM 204c with the HDD data bus 316a. In this case, the computer program can be loaded to the RAM 204c and is activated when the image processing apparatus 5b is powered. Accordingly, in the image processing apparatus 5b, the system controller 204 is a main unit to control the anti-copy protection operation according to the anti-copy protection program prestored either in the ROM 204b or the HDD 316.

Figure 11:
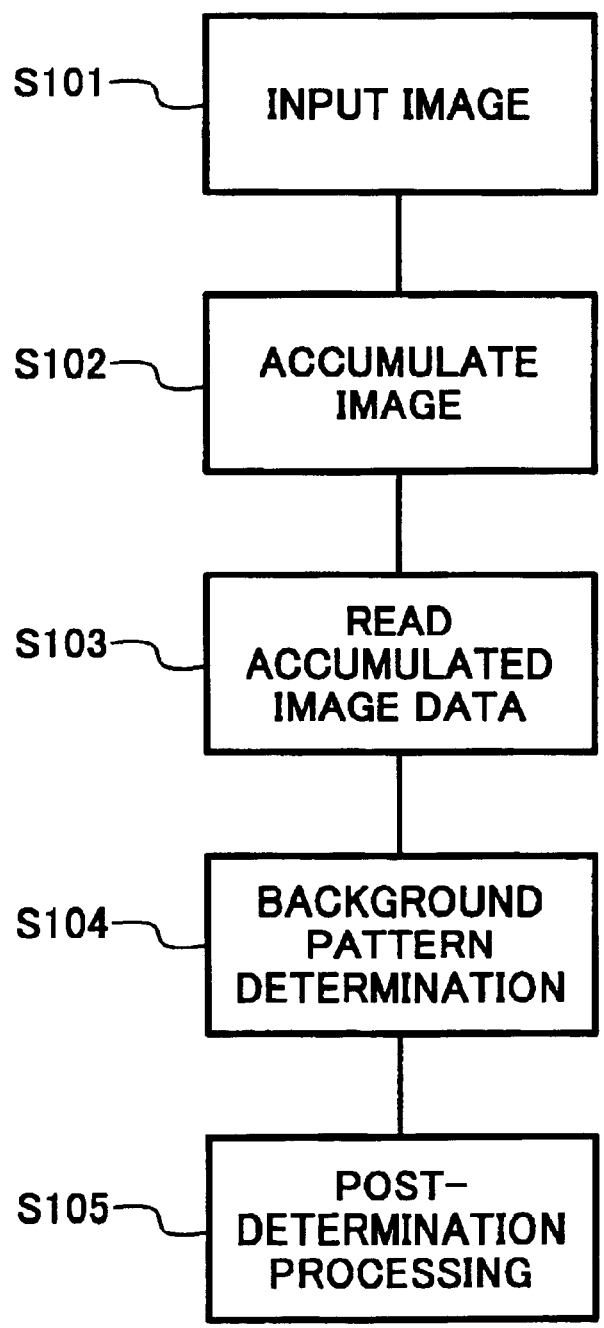
FIG. 11 is a flowchart for explaining a basic operational flow of an operation performed by hardware resources of the image processing apparatus of FIG. 9.

Referring to FIG. 11, an exemplary basic procedure of the anti-copy protection operation performed by the image processing apparatus 5b (FIG. 10) is explained. It should be noted that this procedure can also apply to the image processing apparatus 5a of FIG. 8. In step S101, the CPU 204a (FIG. 10) instructs the scanner 201 (FIG. 10) to read an original image (e.g., the original image 101 (e.g., FIG. 3)) and to input image data of the original image 101 to the image processor 302 (FIG. 10). Then, in step S102, the CPU 204a (FIG. 10) saves the image data input in step S101 into the HDD 316 (FIG. 10) through the HDD data bus 316a (FIG. 10).

Then, in step S103, the CPU 204a reads out the image data saved in the HDD 316. In step S104, the CPU 204a performs a determination process of the anti-copy protection operation, further discussed below.

Then, in step S105, the CPU 204a (FIG. 10) executes necessary processes depending upon the result of the determination process of the anti-copy protection operation. For example, when the watermark pattern 103 (e.g., FIG. 3) of the original image 101 (e.g., FIG. 3) is determined as matching the reference anti-copy watermark pattern stored in the memory area, that is, when the original image 101 (e.g., FIG. 3) read by the scanner 201 (FIG. 8) is an anti-copy document, the CPU 204a (FIG. 10) assigns an identification code to the corresponding image data stored in the HDD 316 (FIG. 10). Therefore, when an anti-copy original image (e.g., the original image 101 (FIG. 3)) having a copy-prohibited watermark pattern (e.g., the watermark pattern 103 (FIG. 3)) is read without authorization by the scanner 201 (FIG. 10), the read anti-copy original image is easily identified based on the assigned identification code.

In one example of the process in step S105, when the watermark pattern 103 of the original image 101 (e.g., FIG. 3) is determined in step S104 as matching the reference anti-copy watermark pattern, the CPU 204a (FIG. 10) transmits the determination result together with the assigned identification code to the client PC 2a (FIG. 9), for example, serving as the computer of a manager who controls the authorization of the anti-copy document. This data transmission is executed with e-mail software installed in the HDD 316 (FIG. 10) through the communications interface 214 (FIG. 8). With this procedure, an occurrence of the event that the original image 101 (e.g., FIG. 3) having the anti-copy watermark pattern indicating the anti-copy background dot pattern is read can be notified to the client PC 2a (FIG. 6), that is, to the manager.

In another example of the process in step S105, when the watermark pattern 103 (e.g., FIG. 3) of the original image 101 (e.g., FIG. 3) is determined in step S104 as matching the reference anti-copy watermark pattern, the CPU 204a (FIG. 10) enciphers the image data having the anti-copy background dot pattern and stored in the HDD 316 (FIG. 10) and transmits the determination result and the enciphered image data as well as the assigned identification code to the client PC 2a (FIG. 6), for example, serving as the computer of a manager who controls the authorization of the anti-copy document. The encryption used in this example is not limited to any specific method. Accordingly, by providing the client PC 2a (FIG. 6) with a mechanism for deciphering data, it becomes possible that the client PC 2a (FIG. 6) allows the manager to notice an occurrence of the event that the original image 101 (FIG. 3) having the anti-copy watermark pattern indicating the anti-copy background dot pattern is read and to browse the enciphered anti-copy document which is read by the scanner 201 (FIG. 10) without authorization executed with e-mail software installed in the HDD 316 (FIG. 10) through the communications interface 214 (FIG. 8).

In transmitting the determination result of step S104 and associated information to the client PC 2a (FIG. 6) in step S105, the sending address of the client PC (i.e., the client PC 2a (FIG. 6) in this case) is specified by an IP (Internet Protocol) address. However, the transmission method is not limited to this since the purpose of the transmission is not in sending the determination information to the client PC itself but in notifying the manager about the determination information through the client PC 2a (FIG. 6). For example, e-mail using e-mail addresses for the Internet or a private line can be used for the transmission of the determination information. For another example, e-mail using e-mail addresses for a cellular phone, a microcellular phone, or the like can also be used.

Figure 12:
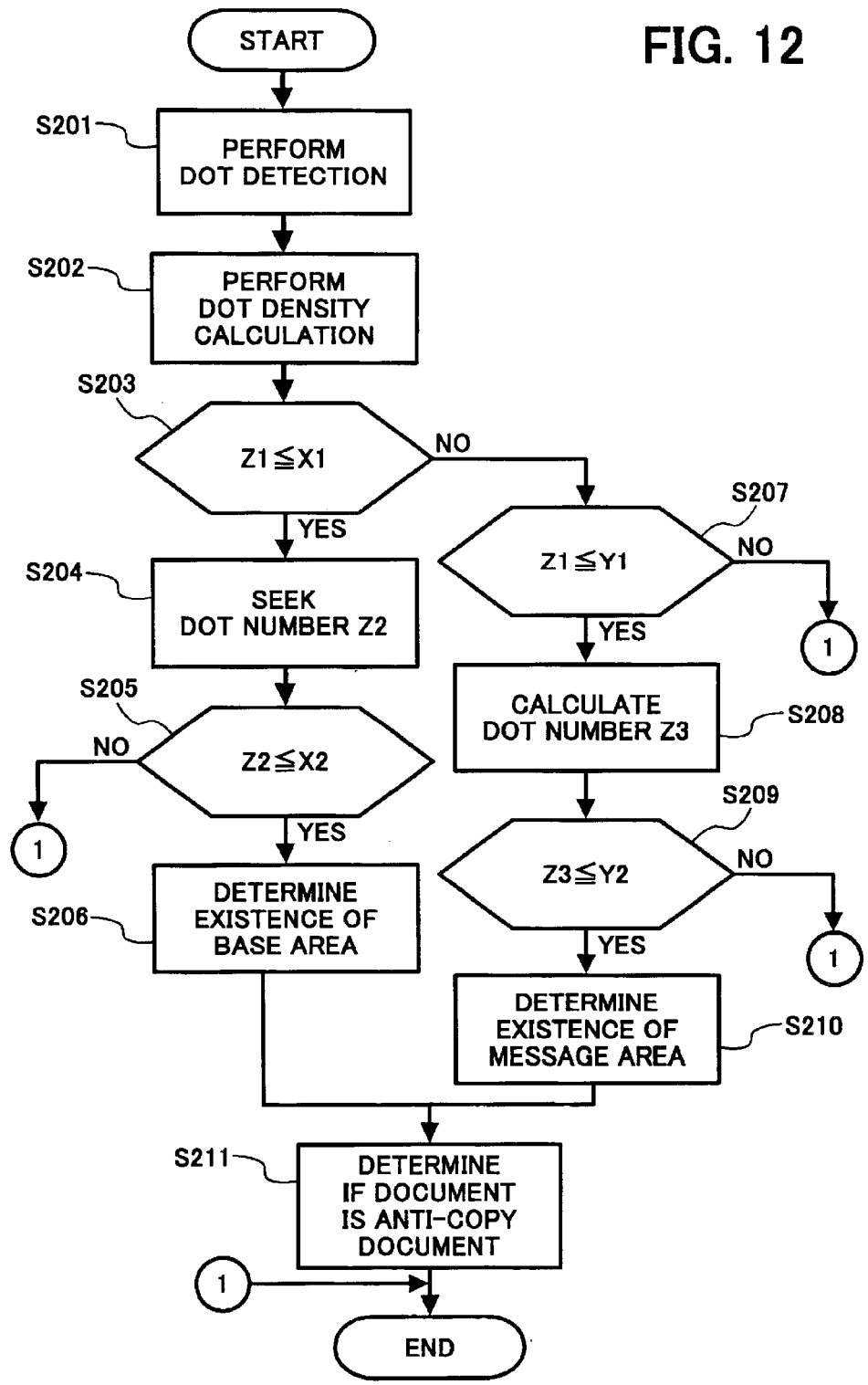
FIG. 12 is a flowchart of an exemplary procedure for performing an anti-copy protection operation using the image processing apparatus of FIG. 8.

Referring to FIG. 12, an exemplary procedure of the anti-copy protection operation performed by the image processing apparatus 5b (FIG. 8), for example, is explained. When the original image 101 (e.g., FIG. 3) is read by the scanner 201 (FIG. 8) and the read image data is stored in the image accumulator 212 (FIG. 8), the CPU 204a detects dots 106 from the image data stored in the image accumulator 212 (FIG. 8), in step S201 of FIG. 12. An actual detection method may be one of various conventional methods for detecting images such as a pattern matching method. Then, in step S202, the CPU 204a (FIG. 8) calculates a dot density Z1 in a specific unit area of the detected dots 106 (e.g., FIG. 4A).

In this exemplary embodiment, the RAM 204c (FIG. 8) includes at least one of a nonvolatile memory and a battery-backed-up memory to store data including a first base area threshold value X1, a second base area threshold value X2, a first message area threshold value Y1, and a second message area threshold value Y2. The first base area threshold value X1 is a permissible value used in an identity determination relative to a dot density in a specific unit area of the base area 104 (e.g., FIG. 3) in the watermark pattern 103 (e.g., FIG. 3) indicating the background anti-copy dot pattern. The above specific unit area is an area on which the black dot density determiner 252 (FIG. 8) performs the dot density calculation. The second base area threshold value X2 is a permissible value used in an identity determination relative to a dot number included in a whole area of the base area 104 (e.g., FIG. 3) in the watermark pattern 103 (e.g., FIG. 3) indicating the anti-copy mark which is included in one original sheet, e.g., the original sheet 102 (e.g., FIG. 3). The first message area threshold value Y1 is a permissible value used in the identity determination relative to a dot density in a specific unit area of the message area 105 (e.g., FIG. 3) in the watermark pattern 103 (e.g., FIG. 3) indicating the background anti-copy dot pattern. The above specific unit area is an area on which the black dot density determiner 252 (FIG. 10) performs the dot density calculation. The second message area threshold value Y2 is a permissible value used in the identity determination relative to a dot number included in a whole area of the message area 105 (e.g., FIG. 3) in the watermark pattern 103 (e.g., FIG. 3) indicating the anti-copy mark which is included in one original sheet, e.g., the original sheet 102 (e.g., FIG. 3).

In step S203, the CPU 204a (FIG. 10) determines whether the dot density Z1 in a specific unit area of the dots 106 (e.g., FIG. 4A) detected in step S201 is smaller than or equal to the first base area threshold value X1, stored in the RAM 204c, for the dot density of the base area 104 (e.g., FIG. 3) included in the watermark pattern 103 (e.g., FIG. 3). The CPU 204a (FIG. 10) executes step S207 when the CPU 204a (FIG. 10) determines that the dot density Z1 in a specific unit area of the dots 106 (e.g., FIG. 4A) detected in step S201 is not smaller than or equal to the first base area threshold value X1 and the determination result of step S203 becomes NO. In step S207, the CPU 204a (FIG. 10) determines whether the dot density Z1 in a specific unit area of the dots 106 (e.g., FIG. 4A) detected in step S201 is smaller than or equal to the first message area threshold value Y1, stored in the RAM 204c (FIG. 10), for the dot density of the message area 105 (e.g., FIG. 3) included in the watermark pattern 103 (e.g., FIG. 3).

When the CPU 204a (FIG. 10) determines that the dot density Z1 in a specific unit area of the dots 106 (e.g., FIG. 4A) detected in step S201 is smaller than or equal to the first base area threshold value X1 and the determination result of step S203 becomes YES, the CPU 204a (FIG. 10) performs a dot number calculation to accumulate the number of the detected dots 106 (e.g., FIG. 4A), in step S204. As a result of the accumulation, an accumulated dot number Z2 is generated and is stored in a registration memory area of the RAM 204c (FIG. 10), for example. Then, in step S205, the CPU 204a determines whether the accumulated dot number Z2 is smaller than or equal to the second base area threshold value X2, stored in the RAM 204c (FIG. 10), for the dot number in the base area 104 (e.g., FIG. 3) of the watermark pattern 103 (e.g., FIG. 3). When the accumulated dot number Z2 is determined as smaller than or equal to the second base area threshold value X2 and the determination result of step S205 is YES, the CPU 204a (FIG. 10) determines that the base area 104 (e.g., FIG. 3) of the anti-copy watermark pattern 103 (e.g., FIG. 3) exists, in step S206. After that, the CPU 204a transmits data indicating this determination result to an anti-copy document determination procedure, in step S211.

When the accumulated dot number Z2 is determined as not smaller than or equal to the second base area threshold value X2 and the determination result of step S205 is NO, the CPU 204a (FIG. 10) determines that the base area 104 (e.g., FIG. 3) of the anti-copy watermark pattern 103 (e.g., FIG. 3) does not exist and processing terminates.

In step S207, when the dot density Z1 in a specific unit area of the dots 106 detected in step S201 is smaller than or equal to the first message area threshold value Y1 and the determination result thereof is YES, the CPU 204a (FIG. 10) executes step S208. In step S208, the CPU 204a (FIG. 10) performs a dot number calculation to accumulate the number of the detected dots 106 (e.g., FIG. 4A). As a result of the accumulation, an accumulated dot number Z3 is generated and is stored in a registration memory area of the RAM 204c (FIG. 10), for example. Then, in step S209, the CPU 204a (FIG. 10) determines whether the accumulated dot number Z3 is smaller than or equal to the second message area threshold value Y2, stored in the RAM 204c (FIG. 10), for the dot number in the message area 105 (e.g., FIG. 3) of the watermark pattern 103 (e.g., FIG. 3). When the accumulated dot number Z3 is determined as smaller than or equal to the second message area threshold value Y2 and the determination result of step S209 is YES, the CPU 204a (FIG. 10) determines that the message area 105 (e.g., FIG. 3) of the anti-copy watermark pattern 103 (e.g., FIG. 3) exists, in Step S210. After that, the CPU 204a (FIG. 10) transmits data indicating this determination result to an anti-copy document determination procedure, in step S211.

The CPU 204a (FIG. 10) will end processing in either case when the dot density Z1 in a specific unit area of the dots 106 (FIG. 4A) detected in step S201 is not smaller than or equal to the first message area threshold value Y1 and the determination result thereof is NO, or when the accumulated dot number Z3 is determined as not smaller than or equal to the second message area threshold value Y2 and the determination result of step S209 is NO.

In step S211, the CPU 204a (FIG. 10) executes the anti-document determination processing with reference to a predetermined standard. This standard can be, for example, established by being input as parameters through the operation panel 205 (FIG. 8) and is stored in a nonvolatile memory and a battery-backed-up memory included in the RAM 204c (FIG. 10). With the thus-prepared exemplary standard, the anti-copy document determination process of the CPU 204a (FIG. 10) in step S211 determines that the present document is an anti-copy document when determining that one of the base area 104 (e.g., FIG. 3) and the message area 105 (e.g., FIG. 3) of the watermark pattern 103 (e.g., FIG. 3) exists in the original image 101 (e.g., FIG. 3) read by the scanner 201 (FIG. 8). In another example, the anti-copy document determining processing by the CPU 204a (FIG. 10) determines that the present document is an anti-copy document when determining that both of the base area 104 (e.g., FIG. 3) and the message area 105 (e.g., FIG. 3) of the watermark pattern 103 (e.g., FIG. 3) exist in the original image 101 (e.g., FIG. 3) read by the scanner 201 (FIG. 8).

Thus, the present embodiment detects from the image data the watermark pattern 103 (e.g., FIG. 3) embedded in the background image which is included in the image data of the original image 101 (e.g., FIG. 3). Then, the present embodiment compares the detected watermark pattern 103 (e.g., FIG. 3) to the prestored reference anti-copy watermark pattern, thereby performing the watermark pattern identity determination. With this operation, the present embodiment can determine whether it is permissible to output the image data of the original image 101 (e.g., FIG. 3), regardless of the types of the original image.

Figure 13:
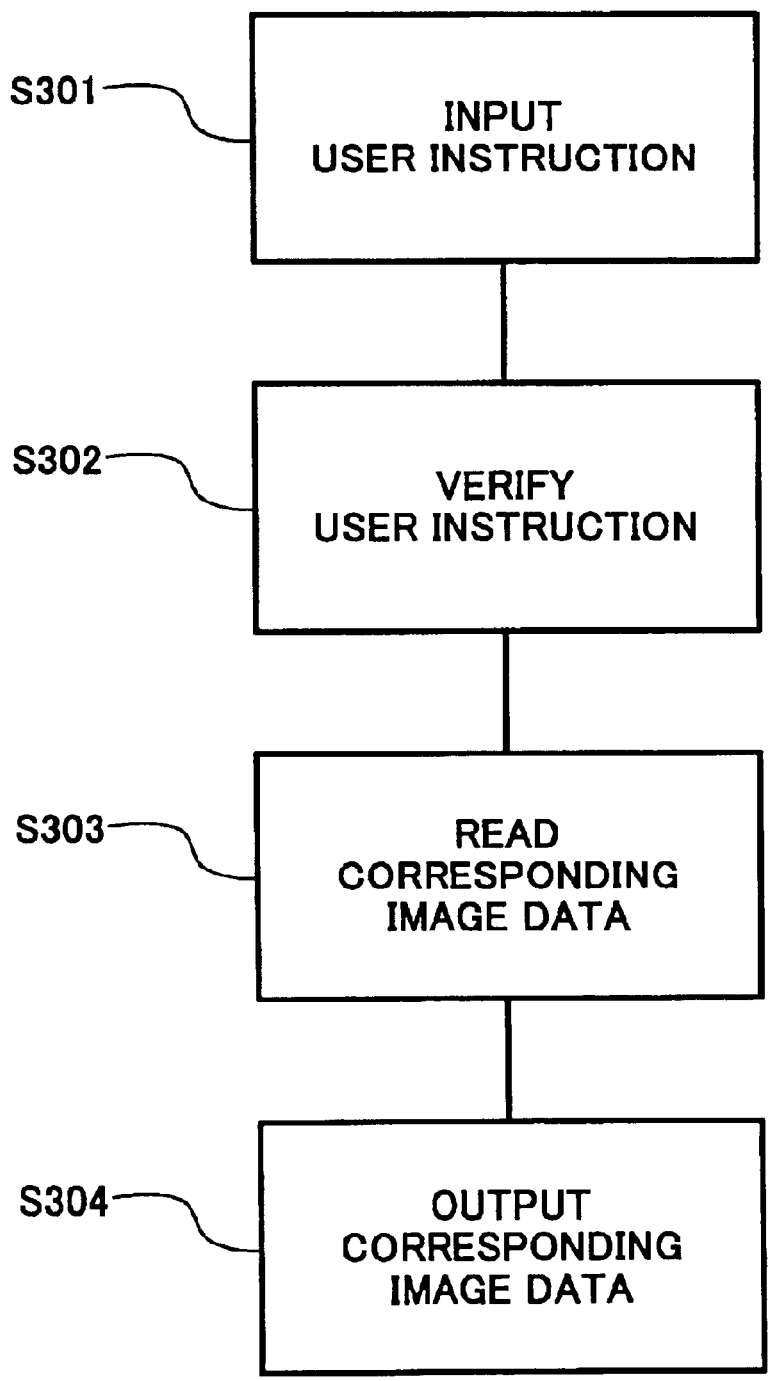
FIG. 13 is a flowchart for explaining an operational flow of the anti-copy protection operation performed by the hardware resources of the image processing apparatus of FIG. 9.

Referring to FIG. 13, an exemplary procedure of an anti-copy document reproducing operation is explained. The manager using the client PC 2a (FIG. 6) can obtain an identification code assigned to the image data read by the scanner 201 (FIG. 10) of the above-described image processing apparatus 5b without authorization and stored in the image accumulator 212 (FIG. 10) through the communications such as e-mail sent from the image processing apparatus 5b (FIG. 10) to the client PC 2a (FIG. 6). By using the identification code, the manager can easily access and obtain the original anti-copy document which is not allowed to be copied without authorization. This is achieved by the process shown in FIG. 13. It would be easier for the manager to track the unauthorized reproduction of the anti-copy document by knowing its actual image.

In one example of the anti-copy document reproducing operation, the manager sends from the client PC 2a (FIG. 6) an instruction for reproducing the anti-copy document with the associated identification code as well as an identification of the manager to the image processing apparatus 5a (FIG. 6). Then, as shown in step S301 of FIG. 13, the CPU 204a (FIG. 8) of the image processing apparatus 5a (FIG. 8) accepts the input of the above instruction from the client PC 2a (FIG. 6). Then, in step S302, the CPU 204a (FIG. 8) verifies the manager's identification and the identification code of the anti-copy image data with data stored in the memory. When the manager's identification and the identification code of the anti-copy image data are successfully verified, the CPU 204a (FIG. 8) reads from the image accumulator 212 (FIG. 10) the image data to which the identification code is assigned, in step S303. Then, the CPU 204a (FIG. 8) instructs the printer 203 (FIG. 8) to reproduce the image data on a recording sheet, in step S304.

In this way, the image processing apparatus 5a (FIG. 8) executes the anti-copy document reproducing operation. The manager can recognize the actual image of the anti-copy original image reproduced without authorization and easily track such unauthorized reproduction of the anti-copy document.

In another example of the anti-copy document reproducing operation, upon being notified of an event that an anti-copy document is reproduced without authorization via the client PC 2a (FIG. 6) by e-mail from the image processing apparatus 5a, the manager may directly manipulate the operation display panel 205 (FIG. 8) of the image processing apparatus 5a (FIG. 8) to input an instruction for reproducing the anti-copy document with the associated identification code as well as an identification of the manager to the image processing apparatus 5a (FIG. 8).

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed as new and desired to be protected by Letters Patent of the United States is:

1. An image processing apparatus, comprising:
   a scanning mechanism configured to read images;
   a first memory storing a reference dot pattern indicating an anti-copy background dot pattern;
   a second memory storing image data;
   an image accumulating mechanism configured to accumulate image data of an original image which is read by the scanning mechanism into the second memory;
   a detecting mechanism configured to detect a background dot pattern embedded in a background image included in said image data of said original image accumulated in said second memory;
   a determining mechanism configured to compare said detected background dot pattern with said reference dot pattern stored in said first memory and to determine whether said detected background dot pattern is substantially identical to said reference dot pattern; and
   a code assigning mechanism configured to assign an identification code to said image data having said detected background dot pattern and accumulated in said second memory when said detected background dot pattern is determined by said determining mechanism as substantially identical to said reference dot pattern.

2. The image processing apparatus of claim 1, further comprising:
   a communications mechanism configured to transmit to a specific computer information indicative of a determination result from said determining mechanism and said identification code assigned to said image data having said detected background dot pattern when said detected background dot pattern is determined by said determining mechanism as substantially identical to said reference dot pattern.

3. The image processing apparatus of claim 1, further comprising:
   a communications mechanism configured to encipher said image data having said detected background dot pattern and stored in said second memory when said detected background dot pattern is determined by said determining mechanism as substantially identical to said reference dot pattern and to transmit to a specific computer information indicative of a determination result from said determining mechanism and said enciphered image data as well as said identification code assigned to said image data having said detected background dot pattern.

4. The image processing apparatus of claim 3, wherein said communications mechanism transmits to said specific computer said information indicative of a determination result from said determining mechanism and said enciphered image data as well as said identification code assigned to said image data having said detected background dot pattern.

5. The image processing apparatus of claim 1, further comprising:
   an information inputting mechanism configured to receive user input, said user input including said identification code; and
   a reproducing mechanism configured to reproduce said image data to which said identification code is assigned when said information inputting mechanism receives said user input of said information including said identification code.

6. The image processing apparatus of claim 1, further comprising:
   an information inputting mechanism configured to receive user input, said user input including said identification code and an identification of a specific user;
   an information verifying mechanism configured to verify said identification code and said identification of said specific user; and
   a reproducing mechanism configured to reproduce said image data to which said identification code is assigned when said information inputting mechanism receives said user input of said information including said identification code and said identification of said specific user and when said information verifying mechanism correctly verifies said identification code and said identification of said specific user.

7. An image processing apparatus, comprising:

scanning means for reading images;

storing means for storing a reference dot pattern indicating an anti-copy background dot pattern and image data;

accumulating means for accumulating image data of an original image which is read by said scanning mechanism into said storing means;

detecting means for detecting a background dot pattern embedded in a background image included in said image data of said original image accumulated in said storing means;

determining means for comparing said detected background dot pattern with said reference dot pattern stored in said storing means and determining whether said detected background dot pattern is substantially identical to said reference dot pattern; and assigning means for assigning an identification code to said image data having said detected background dot pattern and accumulated in said storing means when said detected background dot pattern is determined by said determining means as substantially identical to said reference dot pattern.

8. The image processing apparatus of claim 7, further comprising communicating means for transmitting to a specific computer information indicative of a determination result from said determining means and said identification code assigned to said image data having said detected background dot pattern when said detected background dot pattern is determined by said determining means as substantially identical to said reference dot pattern.

9. The image processing apparatus of claim 7, further comprising:

communicating means for enciphering said image data having said detected background dot pattern and stored in said storing means when said detected background dot pattern is determined by said determining means as substantially identical to said reference dot pattern and transmitting to a specific computer information indicative of a determination result from said determining means, said enciphered image data, and said identification code assigned to said image data having said detected background dot pattern.

10. The image processing apparatus of claim 9, wherein said communicating means transmits to said specific computer said information indicative of a determination result from said determining means, and said enciphered image data, and said identification code assigned to said image data having said detected background dot pattern.

11. The image processing apparatus of claim 7, further comprising:

inputting means for receiving user input, said user input including said identification code; and reproducing means for reproducing said image data to which said identification code is assigned when said information inputting means receives said user input of said information including said identification code.

12. The image processing apparatus of claim 7, further comprising:

inputting means for receiving user input, said user input including said identification code and an identification of a specific user;

verifying means for verifying said identification code and said identification of said specific user; and reproducing means for reproducing said image data to which said identification code is assigned when said inputting means receives said user input of said information including said identification code and said identification of said specific user and when said verifying means correctly verifies said user input including said identification code and said identification of said specific user.

13. An image processing method, comprising:

storing a reference dot pattern indicating an anti-copy background dot pattern and image data;

reading an original image;

accumulating image data of said original image read by said reading step;

detecting a background dot pattern embedded in a background image included in said image data of said original image accumulated by said accumulating step;

comparing said background dot pattern detected by said detecting step with said reference dot pattern stored by said storing step;

determining whether said detected background dot pattern is substantially identical to said reference dot pattern; and assigning an identification code to said image data having said detected background dot pattern and accumulated by said accumulating step when said detected background dot pattern is determined by said determining step as substantially identical to said reference dot pattern.

14. The image processing method of claim 13, further comprising:

transmitting to a specific computer information indicative of a determination result from said determining step and said identification code assigned to said image data having said detected background dot pattern when said detected background dot pattern is determined by said determining step as substantially identical to said reference dot pattern.

15. The image processing method of claim 13, further comprising:

enciphering said image data having said detected background dot pattern and stored by said storing step when said detected background dot pattern is determined by said determining step as substantially identical to said reference dot pattern; and transmitting to a specific computer information indicative of a determination result from said determining step and said enciphered image data as well as said identification code assigned to said image data having said detected background dot pattern.

16. The image processing method of claim 15, wherein said transmitting step transmits to said specific computer said information indicative of a determination result from said determining step, said enciphered image data, and said identification code assigned to said image data having said detected background dot pattern.

17. The image processing method of claim 13, further comprising:

receiving user input, said user input including said identification code; and reproducing said image data to which said identification code is assigned when said receiving step receives said user input.

18. The image processing method of claim 13, further comprising:

receiving user input, said user input including said identification code and an identification of a specific user;

verifying said identification code and said identification of said specific user; and reproducing said image data to which said identification code is assigned when said receiving step receives said user input of said information including said identification code and said identification of said specific user and when said verifying step correctly verifies said identification code and said identification of said specific user.

19. A computer program product stored on a computer readable storage medium for carrying out an image processing method, when run on an image processing apparatus, said method comprising the steps of:

storing a reference dot pattern indicating an anti-copy background dot pattern and image data;

reading an original image;

accumulating image data of said original image read by said reading step;

detecting a background dot pattern embedded in a background image included in said image data of said original image accumulated by said accumulating step;

comparing said background dot pattern detected by said detecting step with said reference dot pattern stored by said storing step;

determining whether said detected background dot pattern is substantially identical to said reference dot pattern; and assigning an identification code to said image data having said detected background dot pattern and accumulated by said accumulating step when said detected background dot pattern is determined by said determining step as substantially identical to said reference dot pattern.

20. The product according to claim 19, wherein said method further comprises:

transmitting to a specific computer information indicative of a determination result made by said determining step and said identification code assigned to said image data having said detected background dot pattern when said detected background dot pattern is determined by said determining step as substantially identical to said reference dot pattern.

21. The product according to claim 19, said method further comprising:

enciphering said image data having said detected background dot pattern and stored by said storing step when said detected background dot pattern is determined by said determining step as substantially identical to said reference dot pattern; and transmitting to a specific computer information indicative of a determination result made by said determining step and said enciphered image data as well as said identification code assigned to said image data having said detected background dot pattern.

22. The product according to claim 21, wherein said transmitting step transmits to said specific computer said information indicative of a determination result made by said determining step and said enciphered image data as well as said identification code assigned to said image data having said detected background dot pattern.

23. The product according to claim 19, said method further comprising:

receiving user input, said user input including said identification code; and reproducing said image data to which said identification code is assigned when said receiving step receives said user input of said information including said identification code.

24. The product according to claim 19, said method further comprising:

receiving user input, said user input including said identification code and an identification of a specific user;

verifying said identification code and said identification of said specific user; and reproducing said image data to which said identification code is assigned when said receiving step receives said user input, and when said verifying step correctly verifies said identification code and said identification of said specific user.

25. A computer readable medium storing computer instructions for performing an image processing method, said method comprising:

storing a reference dot pattern indicating an anti-copy background dot pattern and a first image data;

reading an original image;

accumulating a second image data of said original image read by said reading step;

detecting a background dot pattern embedded in a background image included in said second image data of said original image accumulated by said accumulating step;

comparing said background dot pattern detected by said detecting step with said reference dot pattern stored by said storing step;

determining whether said detected background dot pattern is substantially identical to said reference dot pattern; and assigning an identification code to said second image data having said detected background dot pattern and accumulated by said accumulating step when said detected background dot pattern is determined by said determining step as substantially identical to said reference dot pattern.

26. The storage medium according to claim 25, wherein said method further comprising:

transmitting to a specific computer information indicative of a determination result made by said determining step and said identification code assigned to said second image data having said detected background dot pattern when said detected background dot pattern is determined by said determining step as substantially identical to said reference dot pattern.

27. The storage medium according to claim 25, wherein said method further comprising:

enciphering said second image data having said detected background dot pattern and stored by said storing step when said detected background dot pattern is determined by said determining step as substantially identical to said reference dot pattern; and transmitting to a specific computer information indicative of a determination result made by said determining step and said enciphered image data as well as said identification code assigned to said image data having said detected background dot pattern.

28. The storage medium according to claim 27, wherein said transmitting step transmits to said specific computer said information indicative of a determination result made by said determining step, and said enciphered image data, and said identification code assigned to said second image data having said detected background dot pattern.

29. The storage medium according to claim 25, wherein said method further comprising:

receiving user input, said user input including said identification code; and reproducing said second image data to which said identification code is assigned when said receiving step receives said user input of said information including said identification code.

30. The storage medium according to claim 25, said method further comprising:

receiving user input, said user input including said identification code and an identification of a specific user;

verifying said identification code and said identification of said specific user; and reproducing said image data to which said identification code is assigned when said receiving step receives said user input of said information including said identification code and said identification of said specific user and when said verifying step correctly verifies said identification code and said identification of said specific user.

* * * * *